United States Patent Office 3,477,276
Patented Nov. 11, 1969

3,477,276
DIFFERENTIAL PNEUMATIC MEASURING OR SERVO DEVICES
Andre Louis Fortier, 12 Rue Leon Cambillard, 92, Clamart, France
Filed Oct. 30, 1968, Ser. No. 771,850
Claims priority, application France, Nov. 15, 1967, 128,226
Int. Cl. G01b 13/08
U.S. Cl. 73—37.5     3 Claims

ABSTRACT OF THE DISCLOSURE

In a differential pneumatic measuring or servo device having two pipelines intended to be linked in parallel to the same source of compressed gas, upstream and downstream orifices in the pipelines and a chamber joined to the pipelines between the upstream and downstream orifices and divided by a movable pressure sensitive wall attached to a control member. At least one supplementary outlet orifice is provided in at least one of the pipelines. The perimeter of which supplementary orifice is such that the ratio of the sums of the perimeters of the downstream orifices of the pipelines is equal to the ratio of the cross-sections of the upstream orifices of the respective pipelines.

---

The invention relates to differential pneumatic measuring and servo devices.

In conventional devices variations in pressure of compresed gas supplied to the device gave inaccurate results.

The object of the invention is to improve the differential pneumatic devices in question with a view to avoiding the abovementioned inaccuracies.

In accordance with the invention such a device comprises two pipelines intended to be linked in parallel to the same source of compressed gas, a calibrated upstream supply orifice and a calibrated downstream orifice connecting with the atmosphere in each pipeline, a chamber joined to both pipelines intermediate the respective upstream and downstream orifices, a freely movable sealed pressure sensitive wall dividing the chamber, a control member attached to the movable wall and at least one supplementary outlet orifice in at least one of the two pipelines, the perimeter of which supplementary orifice is such that the ratio of the sums of the perimeters of the downstream orifices of the pipelines is equal to the ratio of the cross-sections of the upstream orifices of the respective pipelines.

The invention envisages more particularly a device in which the outlet orifice of one of the two pipelines is a jet for measuring the proximity of a surface, whereas the outlet orifice of the other pipeline has an effective cross-section regulated by a tapered portion of a rod connected to the movable wall, for example a diaphragm, so that the cross-section of the regulable orifice constantly adapts itself to that of the measuring orifice under the effect of the differential pressure to which the movable wall is subjected before attaining a position of equilibrium.

The invention will be better understood on reading the following description, and on examining the accompanying drawings, which show, by way of example, an embodiment of a pneumatic differential measuring device according to the invention.

Figure 1:
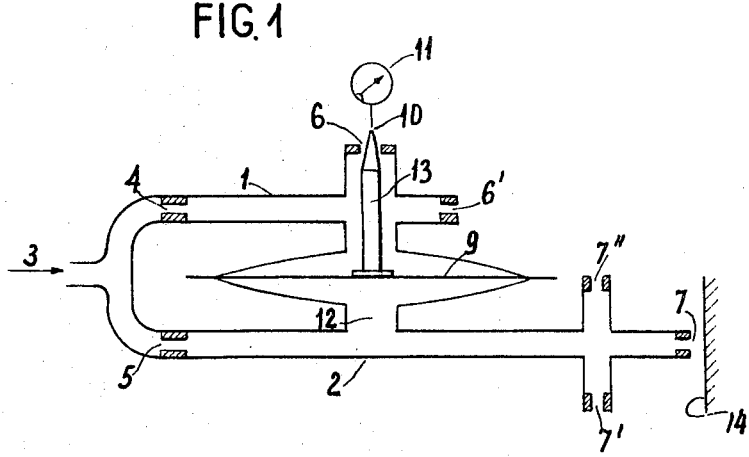
FIG. 1 is a schematic cross-section of the entire device.

The differential measuring device shown schematically in FIG. 1 comprises two pipelines 1 and 2 intended to be linked in parallel to the same source of compressed gas 3.

Pipeline 1 has an upstream calibrated supply orifice 4 and a downstream outlet orifice 6 connecting with the atmosphere, and, in a similar fashion, pipeline 2 has an upstream calibrated supply orifice 5, and a downstream calibrated outlet oirfice 7 connecting with the atmosphere. Both pipelines 1 and 2 intermediate the respective upstream and downstream orifices are joined to a chamber 12 which is divided by a sealed wall in the form of a diaphragm 9 which is movable unrestrictedly. A control member in the form of a rod 13 is attached to the diaphragm 9 and terminates in a tapered portion 10 for adjusting the effective cross-section of the outlet orifice 6. A measuring instrument 11 is operated by movement of the rod 13.

In the example shown, the device serves to measure the proximity of a surface 14 placed in front of the outlet orifice 7 of the other pipe 2.

A state of equilibrium of the diaphragm 9 is obtained when the pressures in pipelines 1 and 2 are equal. There exists a proportion between the cross-sections of orifices 4, 5, 6 and 7; let $S_4$, $S_5$, $S_6$, $S_7$ be the respective cross-sections of the orifices, $p$ and $p'$ the absolute pressures in the two pipelines respectively, and $P_0$ the absolute supply pressure. As a permanent rule, one can say:

$$k_4 P_0 S_4 = k_6 p S_6$$
$$k_5 P_0 S_5 = k_7 p' S_7$$

$k_4$, $k_5$, $k_6$ and $k_7$ being coefficients depending on the form of the orifices and also the pressures obtaining upstream from these orifices.

Since $p = p'$ at the diaphragm's equilibrium, one obtains:

$$\frac{k_4 S_4}{k_5 S_5} = \frac{k_6 S_6}{k_7 S_7}$$

Under these circumstances, the ratio between the cross-sections of the orifices depends in general on the supply pressure and, for given dimensions for cross-sections $S_4$, $S_5$, $S_7$, the dimension of cross-section $S_6$, which corresponds to equilibrium, varies as the supply pressure $P_0$ changes. Only the case when orifices 4 and 5 are identical, and where orifices 6 and 7 have strictly the same shape, corresponds to the simple ratio $S_6 = S_7$, independently of the supply pressure.

The object of the invention is to make the ratio between cross-sections $S_6$ and $S_7$, for given calibrated orifices 4 and 5, independent of the supply pressure in all cases.

This independence is obtained according to the invention by putting additional orifices such as 6', 7', 7'', of suitable cross-sections and perimeters, in parallel with orifices 6 and 7.

In order to show how the additional orifices are chosen, a simple case will be used as an example, with only one additional orifice, e.g. orifice 6' of cross-section $S_{6'}$ and with a coefficient $k_{6'}$, in parallel with orifice 6.

At equilibrium, one obtains:

$$\frac{k_4 S_4}{k_5 S_5} = \frac{k_6 S_6 + k_{6'} S_{6'}}{k_7 S_7}$$

When the absolute supply pressure is sufficiently high, above 4 bars for example, the coefficients $k$ are little different from 1, and they can be expressed in the form $k = 1 - a/PS$, $P$ indicating the pressure upstream from an orifice, $S$ its cross-section, and $a$ a coefficient depending on the shape and size of the orifice principally defined by its perimeter. Under these circumstances, the ratio between the cross-sections is written:

$$\frac{S_4\left(1-\frac{a_4}{P_0 S_4}\right)}{S_5\left(1-\frac{a_5}{P_0 S_5}\right)} = \frac{(S_6+S_{6'})\left(1-\frac{a_6+a_{6'}}{p(S_6+S_{6'})}\right)}{S_7\left(1-\frac{a_7}{pS_7}\right)}$$

and, as the coefficients $k$ differ little from 1, one obtains:

$$\frac{S_4}{S_5} = \frac{S_6+S_{6'}}{S_7}\left[1 - \frac{a_6+a_{6'}}{p(S_6+S_{6'})} + \frac{a_7}{pS_7} - \frac{a_5}{P_0 S_5} + \frac{a_4}{P_0 S_4}\right]$$

Now, as a first approximation, $(S_6+S_{6'})p = P_0 S_4$ and $pS_7 = P_0 S_5$, whence:

$$\frac{S_4}{S_5} = \frac{S_6+S_{6'}}{S_7}\left[1 - \frac{1}{P_0}\left(\frac{a_6+a_{6'}-a_4}{S_4} - \frac{a_7-a_5}{S_5}\right)\right]$$

It can thus be seen that, for given orifices 4, 5, 6, 7, by choosing an orifice 6' such as $$\frac{a_6+a_{6'}-a_4}{S_4} = \frac{a_7-a_5}{S_5}$$

the ratio between the cross-sections no longer depends on $P_0$.

In a more general fashion, if one puts additional orifices 6', 6'', 7', 7'' in parallel with orifices 6 and 7, the ratio between the cross-sections does not depend on the supply pressure $P_0$, when the coefficients $a$ of the orifices verify the equation:

$$\frac{a_6+a_{6'}+a_{6''}-a_4}{S_4} = \frac{a_7+a_{7'}+a_{7''}-a_5}{S_5}$$

As a first approximation, the coefficients $a$ are proportional to the perimeters of the orifices in such a way that the foregoing equation can be replaced by the equation:

$$\frac{l_6+l_{6'}+l_{6''}-l_4}{S_4} = \frac{l_7+l_{7'}+l_{7''}-l_5}{S_5}$$

$l$ indicating the perimeter of an orifice.

Figure 2:
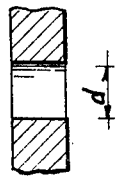
FIGS. 2 to 4 show, on a larger scale, various forms of orifices used in the device.
Figure 3:
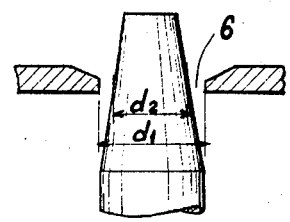
Figure 4:
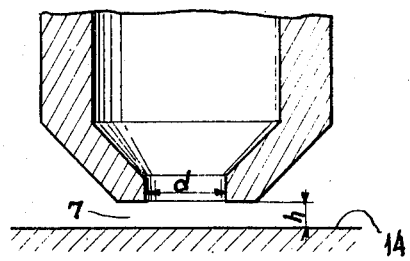

By way of example, FIGS. 2, 3, 4 show three types of orifices currently in use.

The dimensions of cross-section $S$ and of perimeter $l$ of these orifices are as follows.

For that of FIG. 2:

$$S = \frac{\pi d^2}{4}$$

$$l = \pi d$$

For that of FIG. 3:

$$S = \frac{\pi}{4}(d_1^2 - d_2^2)$$

$$l = \pi(d_1 + d_2)$$

and for that of FIG. 4:

$$S = \pi d h$$

$$l = 2\pi d$$

As orifices 4 and 5 are, in general, calibrated jets or small tubes, and orifices 6 and 7 orifices of the type shown in FIGS. 3 or 4, the perimeters $l_4$ and $l_5$ are small in comparison to perimeters $l_6$ and $l_7$. Under these circumstances, the equation leading to the independence of the ratio between the cross-sections with regard to variations in supply pressure can be expressed in the form of the following practical rule: the total perimeters of the downstream orifices of both branches of differential assembly must be proportional to the cross-sections of the calibrated upstream orifices.

Strictly speaking, the proportional ratio between $a$ and $l$ entails a proportional coefficient which depends on the shape of the cross-section and which in consequence is not the same for orifices of different shapes; it is therefore necessary to determine experimentally, by using additional orifices of given shape and different sizes, the dimensions of the additional orifices which correspond to the independence of the ratio between the cross-sections with regard to variations in supply pressure.

This experimental determination is done in the following way: given the orifices 4, 5, 6 and 7 (FIG. 1), the device is supplied at a pressure $P_0$ equal to 6 bars, for example; the pointer 10 takes up a position of equilibrium marked on the measuring instrument 11. For a different supply pressure, 4 bars for example, the pointer takes up another position of equilibrium, rising for example, which corresponds to a decrease of cross-section $S_6$. Since cross-section $S_6$ decreases when pressure $P_0$ decreases, this proves that the term:

$$1 - \frac{1}{P_0}\left(\frac{a_6-a_4}{S_4} - \frac{a_7-a_5}{S_5}\right)$$

increases when $P_0$ decreases and, in consequence, that the term:

$$\frac{a_6-a_4}{S_4} - \frac{a_7-a_5}{S_5}$$

is negative. In order to annul this term, an orifice 6' must be added in parallel with orifice 6. For example, an orifice is chosen which has the shape of FIG. 3, the diameters $d_1$ and $d_2$ having given dimensions near a value $d$ defining the size of the orifice. If, when one passes from the pressure $p_0=6$ bars to $P_0=4$ bars, the pointer mounts again, providing that the diameter of orifice 6' is too small, and a new test is carried out with a larger diameter.

If, on the contrary, the pointer drops on passing from 6 to 4 bars, the diameter $d$ of the orifice 6' is too large, and it must be decreased. Thus, with the help of several orifices 6' of different diameters by successive approximations, the suitable diameter is obtained which makes the pointer's position of equilibrium independent of the pressure $P_0$.

The device described is in the form of a measuring device. However the measuring instrument 11 could be omitted and the rod 13 used for servo operation.

I claim:

1. A differential pneumatic measuring or servo device comprising two pipelines intended to be linked in parallel to the same source of compressed gas, a calibrated upstream supply orifice and a calibrated downstream orifice connecting with the atmosphere in each pipeline, a chamber joined to both pipelines intermediate the respective upstream and downstream orifices, a freely movable sealed pressure sensitive wall dividing the chamber, a control member attached to the movable wall and at least one supplementary outlet orifice in at least one of the two pipelines, the perimeter of which supplementary orifice is such that the ratio of the sums of the perimeters of the downstream orifices of the pipelines is equal to the ratio of the cross-sections of the upstream orifices of the respective pipelines.

2. A device according to claim 1, wherein the movable wall is a diaphragm.

3. A device according to claim 1, wherein the control member is a rod having a tapered portion for altering the effective cross-section of a downstream orifice.

References Cited

UNITED STATES PATENTS

| | | | |
|---|---|---|---|
| 2,564,527 | 8/1951 | Fortier | 73—37.5 |
| 2,571,557 | 10/1951 | Fortier | 73—37.5 |
| 2,792,569 | 5/1957 | Byrkett | 73—73.5 XR |

LOUIS R. PRINCE, Primary Examiner

WILLIAM A. HENRY II, Assistant Examiner